United States Patent
Ibuka et al.

(10) Patent No.: US 7,564,983 B2
(45) Date of Patent: Jul. 21, 2009

(54) AUDIO PLAYBACK DEVICE CAPABLE OF INDEPENDENT OPERATIONS IN DUAL MODES

(75) Inventors: Akira Ibuka, Tokyo (JP); Kuniko Yamasaki, Tokyo (JP); Yoshihide Koyama, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 527 days.

(21) Appl. No.: 10/670,523

(22) Filed: Sep. 26, 2003

(65) Prior Publication Data

US 2004/0125703 A1 Jul. 1, 2004

(30) Foreign Application Priority Data

Sep. 27, 2002 (JP) .......................... P2002-282972
Jan. 29, 2003 (JP) .......................... P2003-020089

(51) Int. Cl.
*H02B 1/00* (2006.01)
(52) U.S. Cl. .................... 381/123; 381/86; 369/2
(58) Field of Classification Search ............... 381/86, 381/123
See application file for complete search history.

(56) References Cited

U.S. PATENT DOCUMENTS

| | | | | |
|---|---|---|---|---|
| 4,602,358 | A * | 7/1986 | Sato ........................ | 369/12 |
| 5,034,996 | A * | 7/1991 | Carey et al. ............... | 455/345 |
| 5,420,931 | A * | 5/1995 | Donner ..................... | 381/86 |
| 5,661,811 | A * | 8/1997 | Huemann et al. ........... | 381/309 |
| 5,722,069 | A * | 2/1998 | Donner ..................... | 455/418 |
| 5,978,689 | A * | 11/1999 | Tuoriniemi et al. ....... | 455/569.1 |
| 6,330,337 | B1 * | 12/2001 | Nicholson et al. ......... | 381/86 |
| 6,567,655 | B1 * | 5/2003 | Wietzke et al. ............ | 455/345 |
| 6,845,308 | B2 * | 1/2005 | Kobata et al. ............. | 701/36 |
| 6,944,287 | B2 * | 9/2005 | Mori ........................ | 379/390.01 |
| 6,957,134 | B2 * | 10/2005 | Ramseyer et al. .......... | 381/86 |
| 7,006,645 | B2 * | 2/2006 | Fujita et al. ............... | 381/307 |
| 7,190,798 | B2 * | 3/2007 | Yasuhara ................... | 381/86 |
| 7,218,740 | B1 * | 5/2007 | Kowaki ..................... | 381/18 |

(Continued)

FOREIGN PATENT DOCUMENTS

CN          1325250 A     5/2001

(Continued)

OTHER PUBLICATIONS

On-Vehicle Audio Visual Reproducing Device, Shimizu Shinichi, JP 2001-114027, Apr. 24, 2001, Abstract only.*

*Primary Examiner*—Tan X Dinh
(74) *Attorney, Agent, or Firm*—McGinn IP Law Group, PLLC

(57) ABSTRACT

A play-back device includes a body device including: a playback mode setting unit for selecting a plurality of playback modes such as a CD mode, an AM mode and an FM mode; a front side speaker and a rear side headphone for selecting an arbitrary one of the playback modes to output play-back signals in the arbitrary playback mode; a front operation unit for operations relating to the front side; and a rear operation unit for operations relating to the rear side. Further included is a control unit for not accepting but making ineffective an operation to release a mute/pause state, even if done from the rear operation unit, when it is decided that the front side is in the mute/pause state while the front side and the rear side are in a common playback mode.

23 Claims, 6 Drawing Sheets

U.S. PATENT DOCUMENTS

| | | | |
|---|---|---|---|
| 2003/0012389 A1* | 1/2003 | Brice et al. | 381/86 |
| 2003/0053638 A1* | 3/2003 | Yasuhara | 381/86 |
| 2003/0103634 A1* | 6/2003 | Ito | 381/86 |
| 2003/0215102 A1* | 11/2003 | Marlowe | 381/86 |
| 2004/0062402 A1* | 4/2004 | Fujita et al. | 381/18 |
| 2004/0106392 A1* | 6/2004 | Yamasaki et al. | 455/352 |

FOREIGN PATENT DOCUMENTS

| | | | | |
|---|---|---|---|---|
| JP | 11-75284 | | 3/1999 | |
| JP | 2001-069598 | * | 3/2001 | 369/2 |

* cited by examiner

AUDIO PLAYBACK DEVICE CAPABLE OF INDEPENDENT OPERATIONS IN DUAL MODES

BACKGROUND OF THE INVENTION

1. Field of the Invention

The present invention relates to a play-back device such as an audio device, which includes a first operation unit (or a front operation unit) and a second operation unit (or a rear operation unit) for operations to control and output play-back signals from play-back sources having a playback function of recording media such as a CD, an MD, a DVD and so on and a receiving function of an AM/FM radio broadcasts.

2. Description of the Related Art

In recent years, a vehicular audio system provided with a dual medial function is known as such audio device.

An audio device providing with such dual media function includes a plurality of speakers so that it can play back the play-back signals from the play-back sources simultaneously, and makes the directivities of the individual speakers variable, as disclosed in JP-A-11-75284.

With reference to the accompanying drawing, here will be described one example of the vehicular audio system, which is provided with such general dual media function. FIG. 6 is a system construction diagram showing the entire construction of the vehicular audio system having a general dual media function.

The vehicular audio system 100, as shown in FIG. 6, is constructed to include: a body device 101 arranged on the front side in a vehicular compartment and provided with a plurality of play-back sources including a CD playback function and a receiving function of an AM/FM radio; a front operation unit 102 for operating the body device 101 on the front side; a rear operation unit 103 for operating the body device 101 remotely on the rear side in the compartment; and a speaker 104 and a headphone 105 for aurally outputting sound signals coming from the play-back sources of the body device 101.

The speaker 104 is composed of two front speakers 104A arranged on the front side, and two rear speakers 104B arranged on the rear side. On the other hand, the headphone 105 is arranged on the rear side.

Moreover, the play-back sources include the CD playback unit and the AM/FM radio tuner unit, the latter of which acts as an AM tuner and an FM tuner so that it can receive the AM broadcast and the FM broadcast by itself.

Here, the front operation unit 102 corresponds to the front panel, as arranged on the front side, of the body device 101, and the rear operation unit 103 corresponds to the remote operation unit arranged on the rear side.

Moreover, the front operation unit 102 and the rear operation unit 103 are provided a playback mode key (as will be abbreviated into the "MODE" key) for selecting at least one of play-back sources, and a preset key capable of receiving the receiving frequency of the radio broadcasting station registered in advance, by a single-touch operation. Here, the playback modes are exemplified in the CD mode for selecting and operating the CD playback unit as the play-back source, the AM mode for selecting and operating the AM/FM radio tuner unit to receive the AM broadcast, and the FM mode for selecting and operating the AM/FM radio tuner unit to receive the FM broadcast.

Moreover, the front operation unit 102 and the rear operation unit 103 are provided with various action keys including: a track UP/DOWN key for selecting and playing back the track of a CD in the CD mode, a seek UP/DOWN key for seeking and receiving a receiving frequency of the radio, and a mute/pause key for pausing the CD being played back, temporarily and for muting the sound output of the radio broadcast.

Moreover, the body device 101 has a dual media function and can be switched and set to a single mode or a dual mode as the system setting mode in response to a predetermined operation from the front operation unit 102.

In the single mode, the sound signals from one of the play-back sources are aurally outputted exclusively from the speaker 104.

In the dual mode, the sound signals from one of the play-back sources are aurally outputted from the speaker 104, whereas the sound signals from another play-back source are aurally outputted from the headphone 105.

In case the body device 101 is demanded for provisions of sound signals from different play-back sources such that a passenger on the front side requests the FM mode whereas a passenger on the rear side requests the CD mode, the dual mode can be set by operating the front operation unit 102 in a predetermined manner. Then, the sound signals of the FM broadcast can be aurally outputted on the front side from the speaker 104, and the sound signals from the CD playback unit can be aurally outputted on the rear side from the headphone 105.

In short, the front passenger and the rear passenger can accept the sound signals from the different play-back sources through the speaker 104 and the headphone 105.

According to the vehicular audio system 100 having such dual media function, the dual mode can be set in response to the predetermined operation of the front operation unit 102. In this duel mode, the sound signals from the different play-back sources can be provided through the speaker 104 and the headphone 105. Therefore, the front and rear passengers can listen to the sound signals from the different play-back sources. Here in this vehicular audio system 100, it goes without saying that the common play-back source (or the common playback mode) can be selected in the dual mode on the front side and on the rear side so that the sound signals from the common sound source can be provided on the front side and on the rear side.

In the vehicular audio system 100 provided with such dual media function, moreover, all the key operations from the front operation unit 102 and the rear operation unit 103 are effectively accepted even in the single mode and in the dual mode. Therefore, the front and rear passengers can acquire desired actions through those front operation unit 102 and rear operation unit 103.

According to the vehicular audio system 100 having the dual media function, moreover, when the use of a telephone is detected by a telephone interrupting function, the mute/pause function is automatically started to bring the sound signals being aurally outputted into an output-stopped state so that the telephone using environment can be made satisfactory.

According to the vehicular audio system 100 having the aforementioned general dual media function, however, all the key operations of the rear operation unit 103 are effectively accepted even in the dual mode. Although the front passenger brings the CD playback into a temporary stopped state (or an output stopped state) in the dual mode and in the common playback mode such as in the CD mode on the front side and on the rear side by operating the mute/pause key of the front operation unit 102 so as to make conversations, for example, the temporary stopped state is randomly released against the will of the front passenger in response to a predetermined operation of the rear operation unit 103 by the rear passenger.

According to this vehicular audio system 100, moreover, although the CD playback is brought into the temporary stopped state (or the output stopped state) in the dual mode and in the common playback mode such as in the CD mode on the front side and on the rear side by detecting the use of the telephone with the telephone interrupting function, not only the temporary stopped state is randomly released but also even the playback track position is randomly changed against the will of the front passenger by the key operation of the action key of the rear operation unit 103 such as the track UP/DOWN key in the CD mode by the rear passenger.

According to this vehicular audio system 100, moreover, all the key operations of the rear operation unit 103 are effectively accepted even in the single mode. Although the front passenger brings the CD playback into the temporary stopped state in the single mode by operating the mute/pause key of the front operation unit 102 so as to make conversations, for example, the temporary stopped state is randomly released against the will of the front passenger in response to a predetermined operation of the rear operation unit 103 by the rear passenger.

According to this vehicular audio system 100, moreover, the CD playback is brought into the temporary stopped state (or the output stopped state) in the dual mode and in the individual playback modes on the front side and on the rear side such as in the CD mode on the front side by detecting the use of the telephone with the telephone interrupting function. However, the rear operation unit 103 can accept the key operation to control the CD mode on the front side, such as the key operation of the volume control or the track UP/DOWN key operation. Against the will of the front passenger, therefore, the conversations of the front passenger are obstructed by the key operation of the rear operation unit 103 such as the volume control by the rear passenger.

SUMMARY OF THE INVENTION

The invention has been conceived in view of the aforementioned points and has an object to provide a play-back device, which can prevent it reliably that the output-stopped state of the play-back signals from a common play-back source on the front side and on the rear side is released while the common play-back source is being selected, even if an operation is done from the rear side.

Another object of the invention is to provide a play-back device, which is enabled to prevent it reliably by detecting an interruption with a telephone interrupting function while a common play-back source is being selected on the front side and on the rear side that not only the output-stopped state is released in the case of the output-stopped state of the play-back signals even if an operation relating to the play-back signals of the output-stopped state is done from the rear side but also the operation is effectively accepted.

Still another object of the invention is to provide a play-back device, which can prevent it reliably that the output-stopped state of play-back signals from a play-back source is released in the case of the output-stopped state on the front side, even if an operation is done from the rear side.

A further object of the invention is to provide a play-back device, which can prevent such an operation on the rear side reliably as will obstruct the communications of a telephone being used.

In order to achieve the aforementioned object, according to a first aspect of the invention, there is provided a play-back device including: a plurality of play-back sources; a first output unit and a second output unit for selecting at least one of the play-back sources to output play-back signals from the at least one of the play-back sources; a first operation unit for operations relating to the first output unit; and a second operation unit for operations relating to the second output unit. The play-back device further includes a control unit for inhibiting, when a common play-back source is selected by the first output unit and the second output unit and if it is decided that the play-back signals from the selected play-back source are in an output-stopped state, the release of the output-stopped state even if the operation to release the output-stopped state is done from the second operation unit.

According to the first aspect of the invention, therefore, when the common play-back source is selected by the first output unit and the second output unit and if it is decided that the play-back signals from the play-back source selected are brought into the output-stopped state, the release of the output-stopped state is inhibited even if the operation to release the state is done from the second operation unit. In case the play-back signals from the play-back source are in the output-stopped state while the common play-back source is being selected by the first output unit (on the front side) and the second output unit (on the rear side), therefore, it is possible to reliably prevent the situation, in which that output-stopped state might otherwise be randomly released, even if the operation is done from the second operation unit (on the rear side).

According to a seventh aspect of the invention, there is provided a play-back device including a first operation unit and a second operation unit for operations to control the output states relating to play-back signals from a play-back source. The play-back device further includes a control unit for inhibiting, when the play-back signals from the play-back source is set in an output-stopped state in response to the operation of the first operation unit but even if the operation to release the output-stopped state is done from the second operation unit, the release of the output-stopped state.

According to the seventh aspect of the invention, therefore, when the play-back signals from the play-back source are set in the output-stopped state in response to the operation from the first operation unit, the release of the output-stopped state is inhibited even if the operation to release the state is done from the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to a eighth aspect of the invention, there is provided a play-back device including a first operation unit and a second operation unit for operations to control the output states relating to play-back signals from a play-back source. The play-back device further includes: an interruption detecting unit for detecting an interruption signal; and a control unit for inhibiting, when the play-back signals from the play-back source is set in an output-stopped state in response to the detection of the interruption signal by the interruption detecting unit operation of the first operation unit but even if the operation to release the output-stopped state is done from either the first operation unit or the second operation unit, the release of the output-stopped state.

According to the eighth aspect of the invention, therefore, when the play-back signals from the play-back source are set in the output-stopped state in response to the operation from the first operation unit, the release of the output-stopped state is inhibited even if the operation to release the state is done from either the first operation unit or the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to a tenth aspect of the invention, there is provided a play-back device including: a plurality of play-back sources; a first output unit and second output unit for selecting at least one of the play-back sources to output play-back signals from the at least one of the play-back sources; a first operation unit for operations relating to the first output unit; and a second operation unit for operations relating to the second output unit. The play-back device further includes: interruption detecting unit for detecting an interruption signal; an output stop setting unit for bringing play-back signals from the selected play-back source when the interruption signal is detected by the interruption detecting unit; and a control unit for inhibiting, when a common play-back source is selected by the first output unit and the second unit and if it is decided that the play-back signals from the selected play-back source are in an output-stopped state, the acceptance of the operation even if the operation relating to the play-back signals in the output-stopped state is done from the second operation unit.

According to the tenth aspect of the invention, therefore, if it is decided on the basis of the interruption detection signal to detect the used state of the telephone, for example, that the play-back signals from the common play-back source are brought into the output-stopped state, the operation relating to the play-back signals in the output-stopped state is inhibited to be accepted even if the operation is done from the second operation unit. In case the play-back signals from the play-back source are in the output-stopped state on the basis of the interruption detection signal to detect the used state of the telephone while the common play-back source is being selected by the first output unit (on the front side) and the second output unit (on the rear side), therefore, it is possible to reliably prevent the effective acceptance of the operation on the play-back signals in the output-stopped state and from the second operation unit (on the rear side), even if that operation is done.

According to a eleventh aspect of the invention, there is provided a play-back device including: a plurality of play-back sources; a first output unit and a second output unit for selecting at least one of the play-back sources to output play-back signals from the at least one of the play-back sources; and a first operation unit and a second operation unit for operations to control the output state relating to the play-back signals from the play-back source. The play-back device further includes: an interruption detecting unit for detecting an interruption signal; and a control unit for inhibiting, when the interruption signal is detected by the interruption detecting unit, the acceptance of an operation to control the output state relating to the play-back signals from the play-back source selected by the first output unit, even if the operation is done from the second operation unit.

According to the eleventh aspect of the invention, therefore, even if the operation to control the output state relating to the play-back signals from the play-back source selected by the first output unit (on the front side) is done from the second operation unit (on the rear side) when the used state of the telephone is detected, it is inhibited to accept that operation of the second operation unit. Therefore, a satisfactory communication environment can be provided by reliably preventing the situation, in which the operation of the rear operation unit (on the rear side) relating to the control to obstruct the telephone communications might otherwise be effectively accepted during the communications.

BRIEF DESCRIPTION OF THE DRAWINGS

The above objects and advantages of the present invention will become more apparent by describing preferred exemplary embodiment thereof in detail with reference to the accompanying drawings, wherein:

BRIEF DESCRIPTION OF THE DRAWINGS

Figure 1:
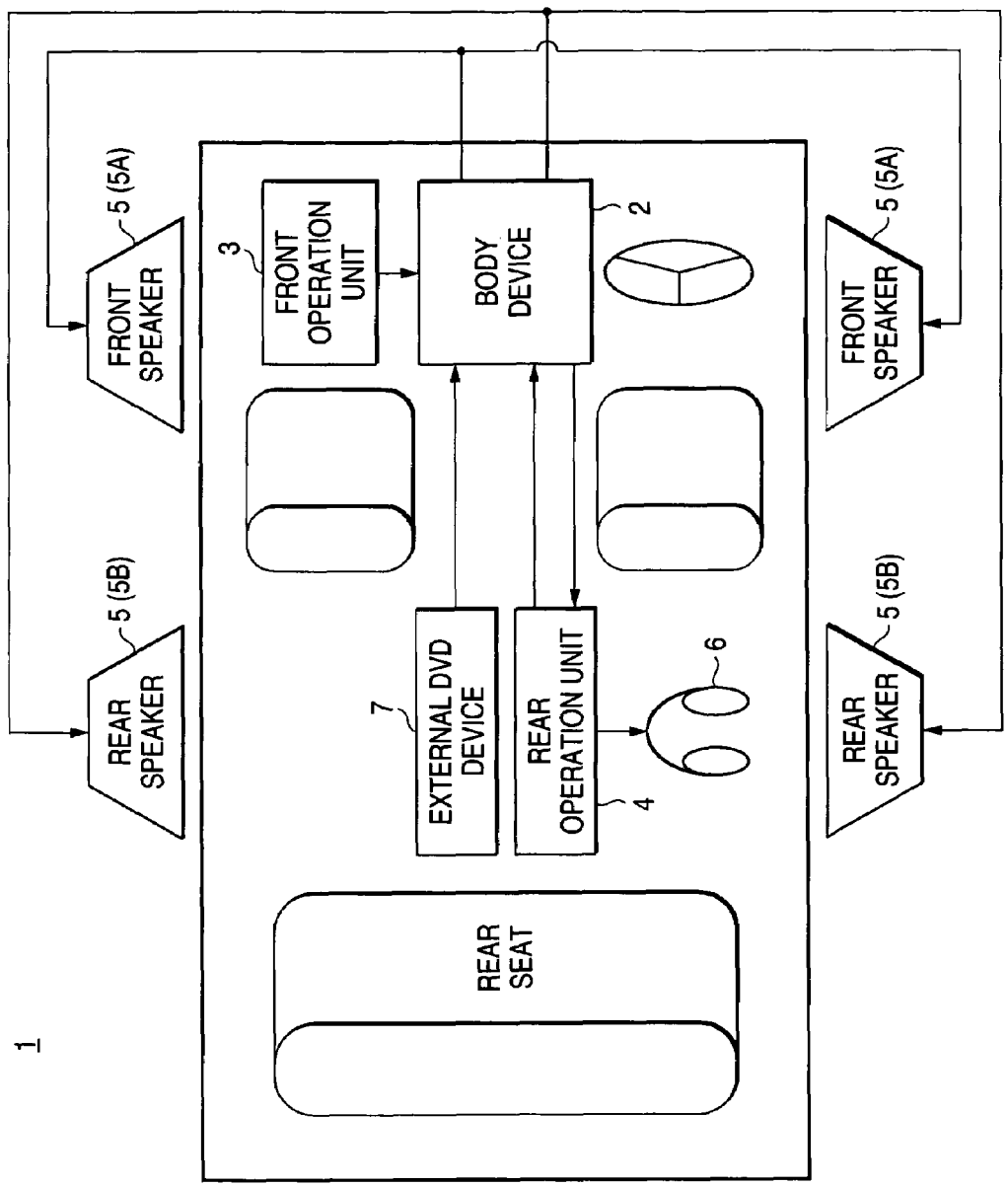
Figure 2:
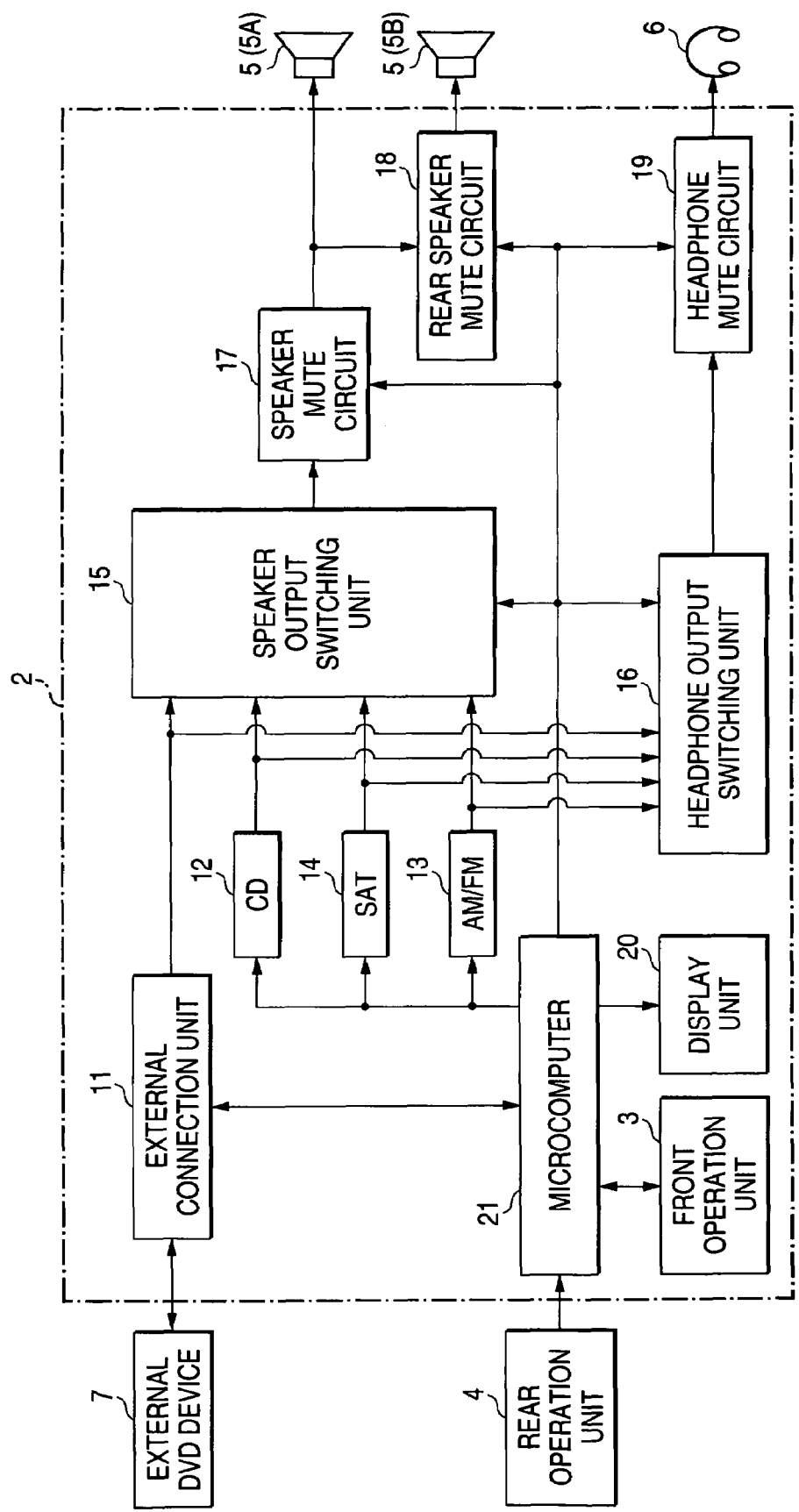
Figure 3:
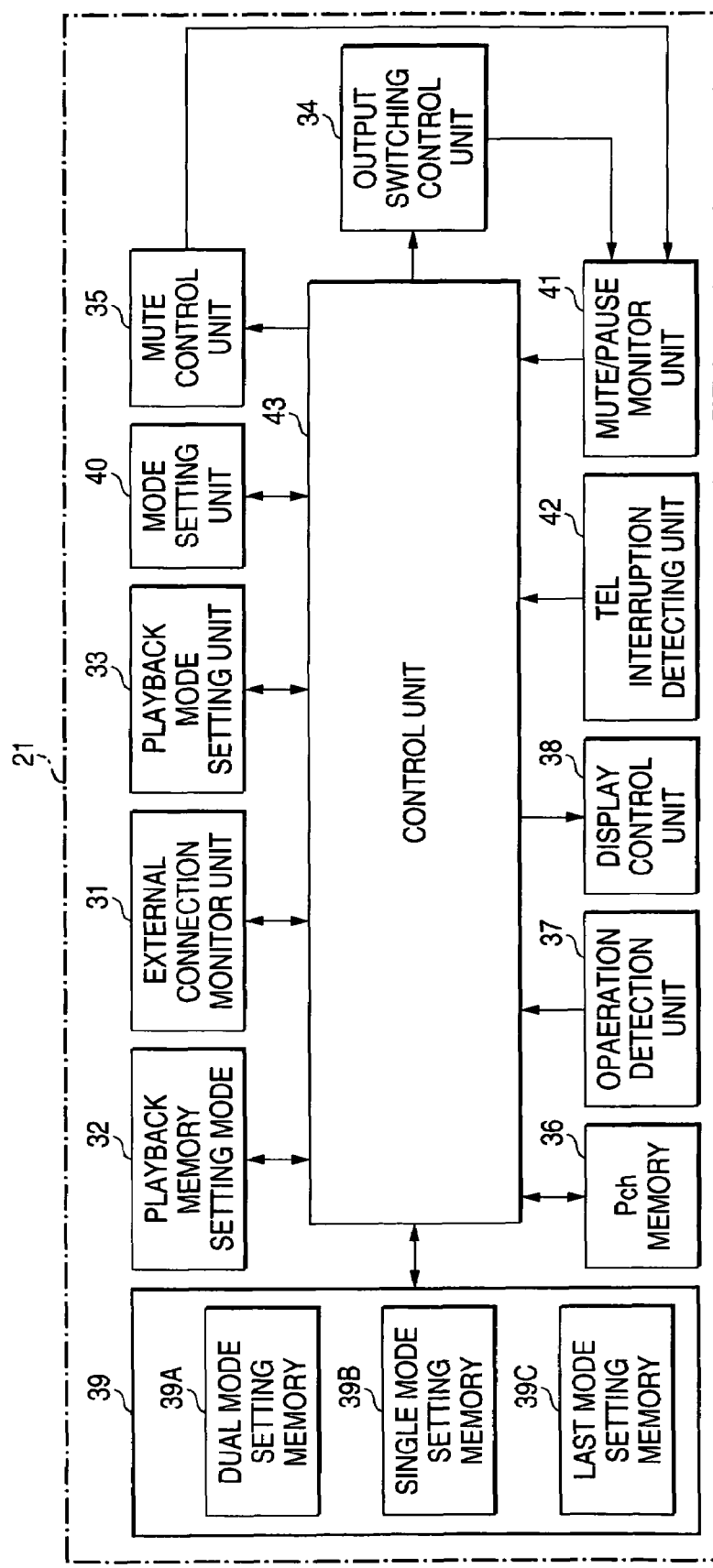
Figure 4:
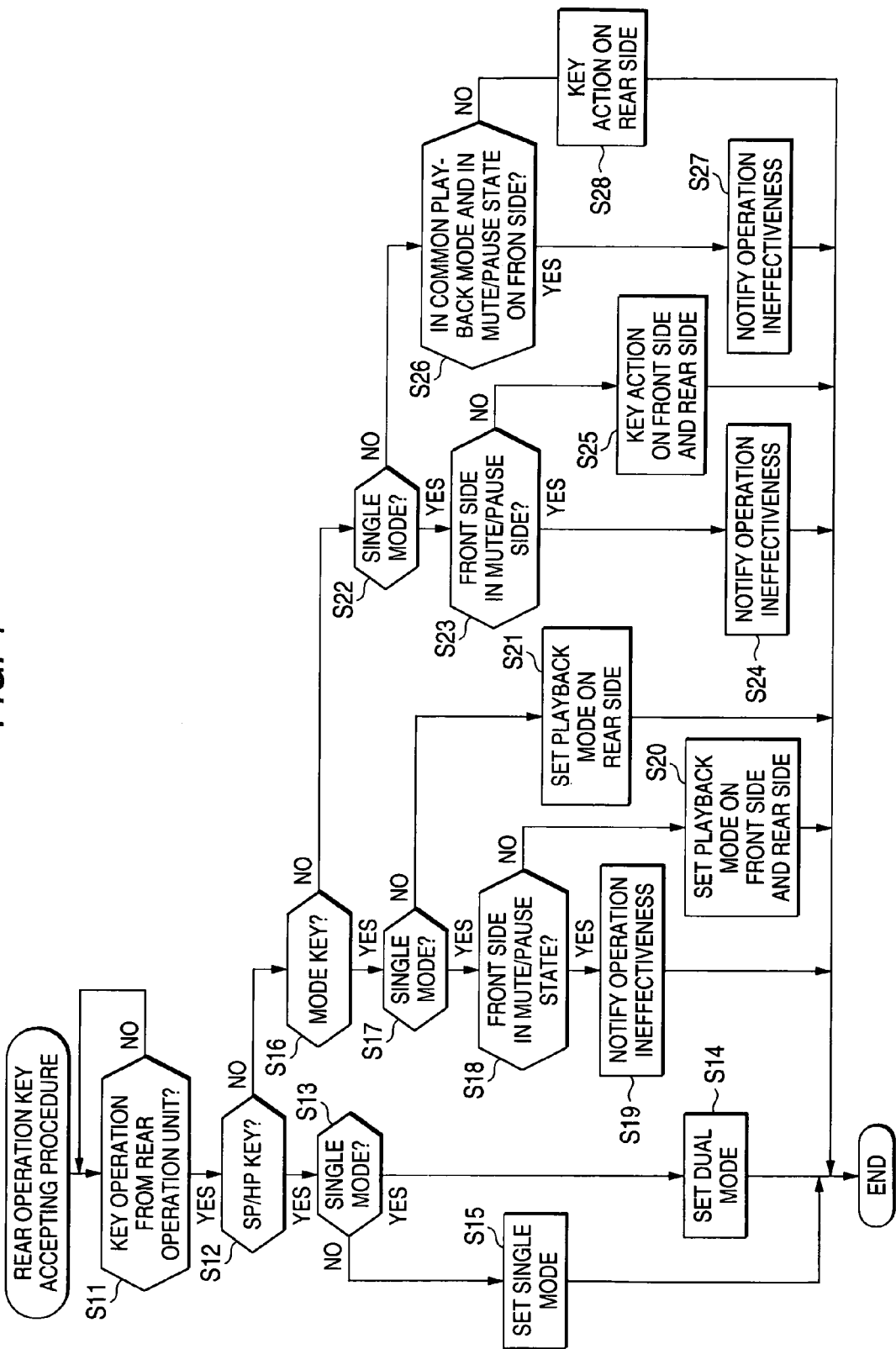
Figure 5:
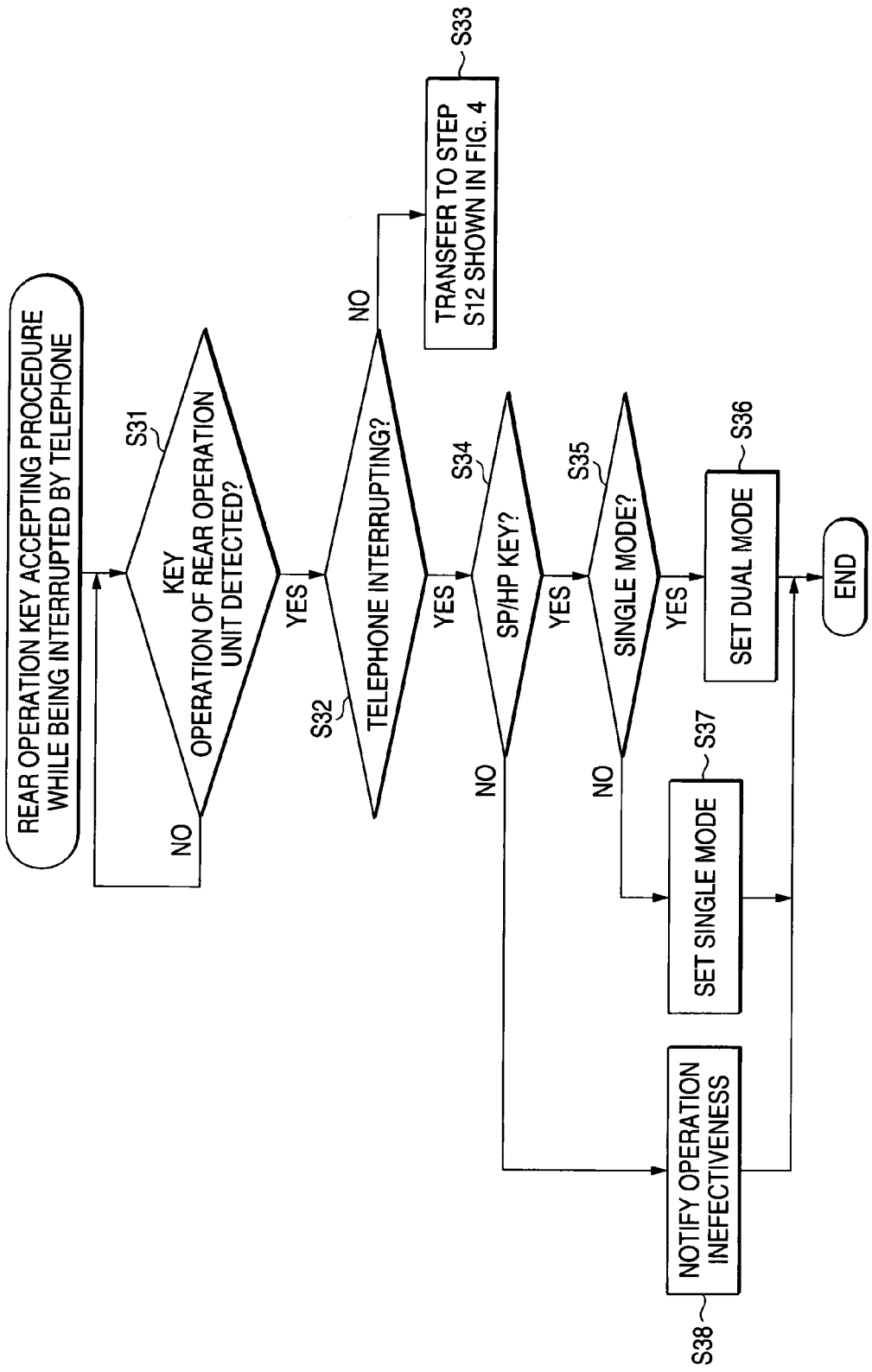
Figure 6:
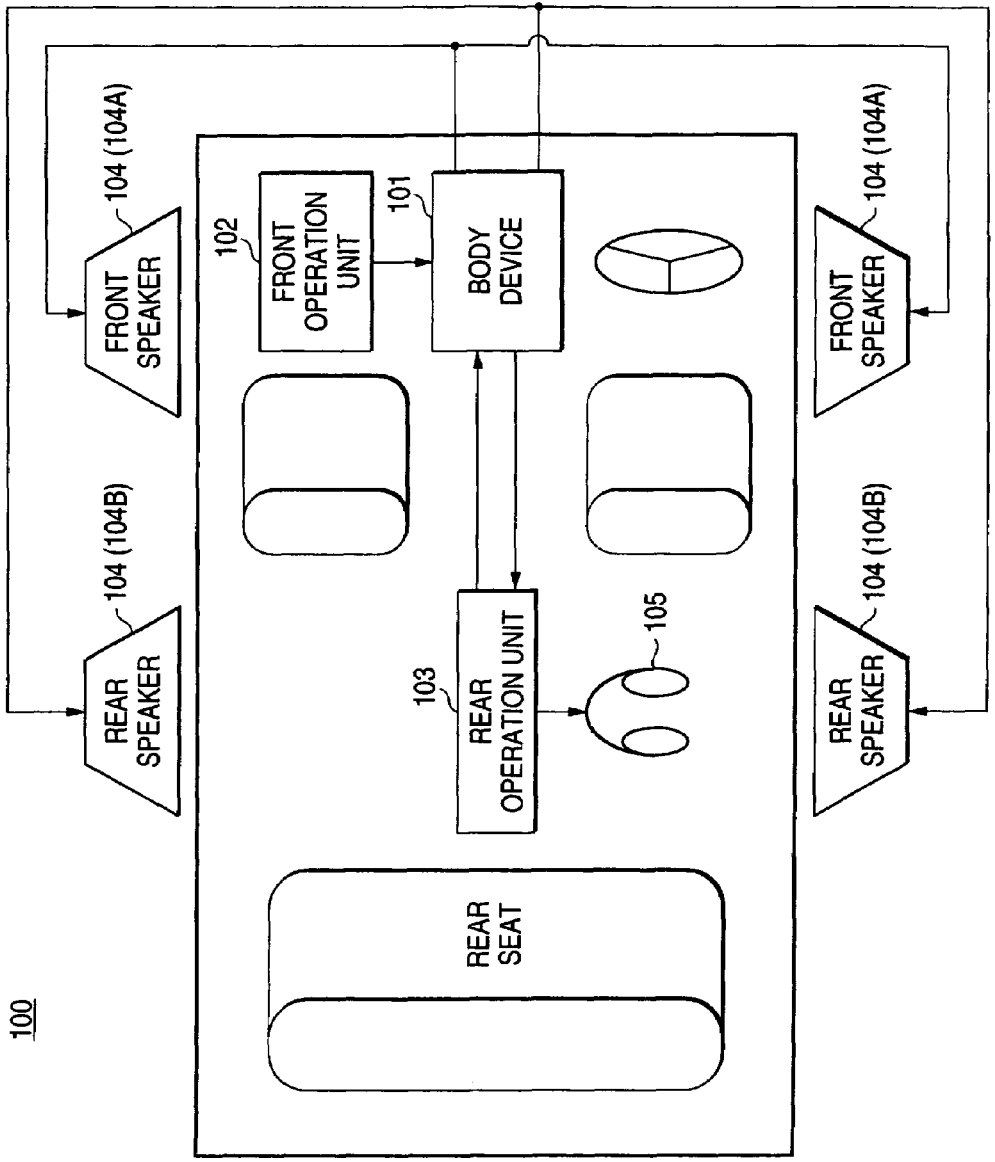

FIG. 1 is a system construction diagram showing the entire construction of a vehicular audio system according to an embodiment of a play-back device of the invention;

FIG. 2 is a block diagram showing the schematic construction of the inside of the body device according to this embodiment;

FIG. 3 is a block diagram showing the schematic construction of the inside of a microcomputer of the body device according to this embodiment;

FIG. 4 is a flow chart showing the processing actions of the microcomputer to participate in the rear operation key accepting procedure of the body device according to this embodiment;

FIG. 5 is a flow chart showing the processing actions of the microcomputer to participate in the rear operation key accepting procedure during the telephone interruption of the body device according to another embodiment; and FIG. 6 is a system construction diagram showing the entire construction of a vehicular audio system having a general dual media function.

DETAILED DESCRIPTION OF THE PREFERRED EMBODIMENTS

Hereinafter, prior to describing preferred embodiments of the invention, various aspects of the invention will be described.

According to a first aspect of the invention, there is provided a play-back device including: a plurality of play-back sources; a first output unit and a second output unit for selecting at least one of the play-back sources to output play-back signals from the at least one of the play-back sources; a first operation unit for operations relating to the first output unit; and a second operation unit for operations relating to the second output unit. The play-back device further includes a control unit for inhibiting, when a common play-back source is selected by the first output unit and the second output unit and if it is decided that the play-back signals from the selected play-back source are in an output-stopped state, the release of the output-stopped state even if the operation to release the output-stopped state is done from the second operation unit.

According to the first aspect of the invention, therefore, when the common play-back source is selected by the first output unit and the second output unit and if it is decided that the play-back signals from the play-back source selected are brought into the output-stopped state, the release of the output-stopped state is inhibited even if the operation to release the state is done from the second operation unit. In case the play-back signals from the play-back source are in the output-stopped state while the common play-back source is being selected by the first output unit (on the front side) and the second output unit (on the rear side), therefore, it is possible to reliably prevent the situation, in which that output-stopped state might otherwise be randomly released, even if the operation is done from the second operation unit (on the rear side).

According to a second aspect of the invention, in addition to the first aspect of the invention, the control unit includes an output stop setting unit for bringing the play-back signals from the selected play-back source in response to the operation from the first operation unit.

According to the second aspect of the invention, therefore, while the common play-back source is selected by the first output unit and the second output unit and if it is decided that the play-back signals from the play-back source selected are brought into the output-stopped state by the first operation unit, the release of the output-stopped state is inhibited even if the operation to release the state is done from the second operation unit. In case the play-back signals from the play-back source are in the output-stopped state by the operation from the first operation unit (on the front side) while the common play-back source is being selected by the first output unit (on the front side) and the second operation unit (on the rear side), therefore, it is possible to reliably prevent the situation, in which that output-stopped state might otherwise be randomly released, even if the operation is done from the second operation unit (on the rear side).

According to the third aspect of the invention, in addition to the first and the second aspect of the invention, the control unit includes: an interruption detecting unit for detecting an interruption signal; and an output stop setting unit for bringing the play-back signals from the selected play-back source into the output-stopped state when the interruption signal is detected by the interruption detecting unit.

According to the third aspect of the invention, therefore, while the common play-back source is selected by the first output unit and the second output unit and if it is decided that the play-back signals from the play-back source selected are brought into the output-stopped state on the basis of the interruption detection signal, the release of the output-stopped state is inhibited even if the operation to release the state is done from the second operation unit. In case the play-back signals from the play-back source are in the output-stopped state on the basis of the interruption detection signal while the common play-back source is being selected by the first output unit (on the front side) and the second output unit (on the rear side), therefore, it is possible to reliably prevent the situation, in which that output-stopped state might otherwise be randomly released, even if the operation is done from the second operation unit (on the rear side).

According to a fourth aspect of the invention, in addition to the third aspect of the invention, the interruption detecting unit detects the interruption signal to detect the used state of a telephone.

According to the fourth aspect of the invention, therefore, if it is decided on the basis of the interruption detection signal to detect the used state of the telephone that the play-back signals from the common play-back source are brought into the output-stopped state, the release of the output-stopped state is inhibited to be accepted even if the operation to release the output-stopped state is done from the second operation unit. In case the play-back signals from the play-back source are in the output-stopped state on the basis of the interruption detection signal to detect the used state of the telephone while the common play-back source is being selected by the first output unit (on the front side) and the second output unit (on the rear side), therefore, it is possible to reliably prevent the situation, in which the output-stopped state might otherwise be randomly released, even if that operation from the second operation unit (on the rear side) is done.

According to a fifth aspect of the invention, in addition to the first to fourth aspect of the invention, the second output unit is a headphone.

According to the fifth aspect of the invention, therefore, the second output unit is exemplified by the headphone so that the individual play-back signals can be aurally outputted to the passenger on the front side and the passenger on the rear side, for example, by the first output unit (on the front side) and the second output unit (on the rear side).

According to a sixth aspect of the invention, in addition to the first to fifth aspect of the invention, the first output unit outputs the play-back signals to the front side of a vehicular compartment, and the second output unit outputs the play-back signals to the rear side of the vehicular compartment.

According to the sixth aspect of the invention, therefore, the play-back signals are outputted to the front side of the vehicular compartment by the first output unit, and the play-back signals are outputted to the rear side of the vehicular compartment by the second output unit, so that the individual play-back signals can be aurally outputted to the passenger on the front side and the passenger on the rear side, for example, by the first output unit (on the front side) and the second output unit (on the rear side).

According to a seventh aspect of the invention, there is provided a play-back device including a first operation unit and a second operation unit for operations to control the output states relating to play-back signals from a play-back source. The play-back device further includes a control unit for inhibiting, when the play-back signals from the play-back source is set in an output-stopped state in response to the operation of the first operation unit but even if the operation to release the output-stopped state is done from the second operation unit, the release of the output-stopped state.

According to the seventh aspect of the invention, therefore, when the play-back signals from the play-back source are set in the output-stopped state in response to the operation from the first operation unit, the release of the output-stopped state is inhibited even if the operation to release the state is done from the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to a eighth aspect of the invention, there is provided a play-back device including a first operation unit and a second operation unit for operations to control the output states relating to play-back signals from a play-back source. The play-back device further includes: an interruption detecting unit for detecting an interruption signal; and a control unit for inhibiting, when the play-back signals from the play-back source is set in an output-stopped state in response to the detection of the interruption signal by the interruption detecting unit operation of the first operation unit but even if the operation to release the output-stopped state is done from either the first operation unit or the second operation unit, the release of the output-stopped state.

According to the eighth aspect of the invention, therefore, when the play-back signals from the play-back source are set in the output-stopped state in response to the operation from the first operation unit, the release of the output-stopped state is inhibited even if the operation to release the state is done from either the first operation unit or the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to a ninth aspect of the invention, in addition to the eighth aspect of the invention, the play-back device further includes a priority setting unit for setting a priority for the first operation unit and the second operation unit, and the control unit inhibits the release of the output-stopped state even if the operation to release the output-stopped state is done from the lower priority one of the first operation unit and the second operation unit on the basis of the priority set by the priority setting unit.

According to the ninth aspect of the invention, therefore, the first operation unit and the second operation unit can be set with the priority, and the operation to release the output-stopped state is inhibited even if the operation is done from the operation unit of the lower priority. Therefore, the operation unit incapable of releasing the output-stopped state can be suitably set on the user side.

According to a tenth aspect of the invention, there is provided a play-back device including: a plurality of play-back sources; a first output unit and second output unit for selecting at least one of the play-back sources to output play-back signals from the at least one of the play-back sources; a first operation unit for operations relating to the first output unit; and a second operation unit for operations relating to the second output unit. The play-back device further includes: interruption detecting unit for detecting an interruption signal; an output stop setting unit for bringing play-back signals from the selected play-back source when the interruption signal is detected by the interruption detecting unit; and a control unit for inhibiting, when a common play-back source is selected by the first output unit and the second unit and if it is decided that the play-back signals from the selected play-back source are in an output-stopped state, the acceptance of the operation even if the operation relating to the play-back signals in the output-stopped state is done from the second operation unit.

According to the tenth aspect of the invention, therefore, if it is decided on the basis of the interruption detection signal to detect the used state of the telephone, for example, that the play-back signals from the common play-back source are brought into the output-stopped state, the operation relating to the play-back signals in the output-stopped state is inhibited to be accepted even if the operation is done from the second operation unit. In case the play-back signals from the play-back source are in the output-stopped state on the basis of the interruption detection signal to detect the used state of the telephone while the common play-back source is being selected by the first output unit (on the front side) and the second output unit (on the rear side), therefore, it is possible to reliably prevent the effective acceptance of the operation on the play-back signals in the output-stopped state and from the second operation unit (on the rear side), even if that operation is done.

According to a eleventh aspect of the invention, there is provided a play-back device including: a plurality of play-back sources; a first output unit and a second output unit for selecting at least one of the play-back sources to output play-back signals from the at least one of the play-back sources; and a first operation unit and a second operation unit for operations to control the output state relating to the play-back signals from the play-back source. The play-back device further includes: an interruption detecting unit for detecting an interruption signal; and a control unit for inhibiting, when the interruption signal is detected by the interruption detecting unit, the acceptance of an operation to control the output state relating to the play-back signals from the play-back source selected by the first output unit, even if the operation is done from the second operation unit.

According to the eleventh aspect of the invention, therefore, even if the operation to control the output state relating to the play-back signals from the play-back source selected by the first output unit (on the front side) is done from the second operation unit (on the rear side) when the used state of the telephone is detected, it is inhibited to accept that operation of the second operation unit. Therefore, a satisfactory communication environment can be provided by reliably preventing the situation, in which the operation of the rear operation unit (on the rear side) relating to the control to obstruct the telephone communications might otherwise be effectively accepted during the communications.

According to a twelfth aspect of the invention, in addition to the eleventh aspect of the invention, the control unit inhibits, when the interruption signal is detected by the interruption detecting unit, the acceptance of the operation of the second operation unit to control the volume of the play-back signals from the play-back source selected by the first output unit, even if the operation is done from the second operation unit.

According to the twelfth aspect of the invention, therefore, even if the operation to control the volume of the play-back signals from the play-back source selected by the first output unit (on the front side) is done from the second operation unit (on the rear side) when the used state of the telephone is detected, it is inhibited to accept that operation of the second operation unit. Therefore, a satisfactory communication environment can be provided by reliably preventing the situation, in which the operation of the rear operation unit (on the rear side) relating to the volume control to obstruct the telephone communications on the front side might otherwise be effectively accepted during the communications.

According to a thirteenth aspect of the invention, in addition to the eleventh and twelfth aspect of the invention, the first output unit outputs the play-back signals to the front side of a vehicular compartment, and the second output unit outputs the play-back signals to the rear side of the vehicular compartment.

According to the thirteenth aspect of the invention, therefore, the play-back signals are outputted to the front side of the vehicular compartment by the first output unit, and the play-back signals are outputted to the rear side of the vehicular compartment by the second output unit, so that the individual play-back signals can be aurally outputted to the passenger on the front side and the passenger on the rear side, for example, by the first output unit (on the front side) and the second output unit (on the rear side).

With reference to the accompanying drawings, here will be described a vehicular audio system having dual media functions according to an embodiment of a play-back device of the invention. FIG. 1 is a system construction diagram showing the entire construction of a vehicular audio system according to the embodiment.

The vehicular audio system 1, as shown in FIG. 1, is constructed to include: a body device 2 arranged on the front side in a vehicular compartment and having a plurality of play-back sources provided with a CD playback function and a receiving function of an AM/FM radio or the like; a front operation unit 3 for operating the body device 2 on the front side; a rear operation unit 4 for operating the body device 2 remotely on the rear side in the compartment; a speaker 5 connected with the body device 2 for aurally outputting sound signals coming from the play-back source of the body device 2; and a headphone 6 connected with the body device 2 for aurally outputting the sound signals coming from the play-back source of the body device 2.

The vehicular audio system 1 further includes an electronic device such as an external DVD device 7 connected from the outside with the body device 2.

The speaker 5 is composed of two front speakers 5A arranged on the front side, and two rear speakers 5B arranged on the rear side. On the other hand, the headphone 6 is arranged on the rear side.

On the other hand, the play-back source is provided with the CD playback function, the satellite broadcasting (as will be abbreviated as the "SAT") radio receiving function and the AM/FM radio function.

Here, the front operation unit 3 corresponds to the front panel, as arranged on the front side, of the body device 2, and the rear operation unit 4 corresponds to the remote operation unit arranged on the rear side.

Moreover, the front operation unit 3 and the rear operation unit 4 are provided with a playback mode selecting key (as will be abbreviated as the "MODE key") for selecting at least one of the play-back sources, and a preset key (as will be abbreviated as the "NEXT key") capable of receiving the receiving frequency of a radio broadcasting station registered in advance, by a single operation.

FIG. 2 is a block diagram showing the schematic construction of the inside of the body device 2 according to this embodiment.

The body device 2, as shown in FIG. 2, is constructed to include: an external connection unit 11 to be connected with the external DVD device 7; a CD playback unit 12, an AM/FM radio tuner unit 13, a SAT ratio tuner unit 14 acting as a plurality of play-back sources; a speaker output switching unit 15 for selecting a play-back source to be outputted to the speaker 5, from the play-back sources including the external DVD device 7, the CD playback unit 12, the AM/FM radio tuber unit 13 and the SAT radio tuber unit 14, to the speaker 5; a headphone output switching unit 16 for selecting a play-back source of the sound signals to be outputted to the headphone 6; a speaker mute circuit 17 for muting the sound signals from the play-back source, as selected by the speaker output switching 15, to the speaker 5; a rear speaker mute circuit 18 for muting the sound signals to the rear speakers 5B; a headphone mute circuit 19 for muting the sound signals from the play-back source, as selected by the headphone output switching unit 16, to the headphone 6; a display unit 20 for displaying various pieces of information; and a microcomputer 21 for controlling the body device 2 as a whole.

The AM/FM radio tuner unit 13 acts as both the AM tuner and the FM tuner to receive the AM broadcast and the FM broadcast with the single tuner.

The body device 2 has dual media functions capable of switching and setting a single mode or a dual mode as the system setting mode so that it is enabled to switch and set the single mode or the dual mode by the key operation of the SP/HP key disposed in the front operation unit 3 or the rear operation unit 4.

In the single mode, the sound signals from one of the play-back sources are aurally outputted exclusively from the speaker 5.

In the dual mode, the sound signals from one of the play-back sources are aurally outputted from the speaker 5, whereas the sound signals from the same play-back source or another play-back source are aurally outputted from the headphone 6.

On the other hand, the body device 2 is provided with a plurality of playback modes, which can be switched and selected by the aforementioned MODE key. Here, the playback modes are divided into: a CD mode for selecting/operating the CD playback unit 12, a SAT mode for selecting/ operating the SAT radio tuner unit 14 to for receive the satellite broadcast; an AM mode for selecting/operating the AM/FM radio tuner unit 13 to receive the AM broadcast; an FM mode for selecting/operating the AM/FM radio tuner unit 13 to receive the FM broadcast; and a DVD mode for selecting/operating the external DVD device 7.

Moreover, the front operation unit 3 and the rear operation unit 4 are provided with various action keys such as the track UP/DOWN key for selecting and playing back the track of the CD in the CD mode, the seek UP/DOWN key for seeking and receiving the receiving frequency of the radio, and the mute/ pause key for pausing the CD being played back and for muting the aural output of the radio broadcast.

FIG. 3 is a block diagram showing the schematic construction of the inside of the microcomputer 21 of the body device 2 according to this embodiment.

The microcomputer 21, as shown in FIG. 3, is constructed to include: an external connection monitor unit 31 for monitoring the external DVD device 7 through the external connection unit 11; a play back mode setting memory 32 stored with the set contents relating the playback modes such as the CD mode, the SAT mode, the AM mode, the FM mode and the DVD mode; a playback mode setting unit 33 for reading the set contents corresponding to the playback mode from the playback mode setting memory 32, in response to the mode selecting operation of the MODE key, for example, to set the same playback mode on the basis of the set contents; an output switching control unit 34 for controlling the speaker output switching unit 15 and the headphone output switching unit 16 on the basis of the playback mode set at that playback mode setting unit 33; a mute control unit 35 for controlling the speaker mute circuit 17, the rear speaker mute circuit 18 and the headphone mute circuit 19; a Pch memory 36 stored with the receiving frequencies of the individual radio broadcasting stations, which can be received in response to the preset channel (as will be abbreviated as the "Pch") of the NEXT key, for example; an operation detection unit 37 for detecting the input operations from the front operation unit 3 and the rear operation unit 4; a display control unit 38 for controlling the display of the display unit 20; a mode setting storage unit 39 stored with the set contents relating to the system setting mode such as the single mode or the dual mode; a mode setting unit 40 for setting the system setting mode on the basis of the set contents stored in the mode setting storage unit 39; a mute/pause monitor unit 41 for monitoring the mute/pause state on the basis of the action states of the output switching control unit and the mute control unit 35; a TEL interruption detecting unit 42 for detecting a telephone interruption detection signal indicating the used state of the telephone; and a control unit 43 for controlling the microcomputer 21 as a whole.

The playback mode setting unit 33: monitors the mode selecting operation of the MODE key from the front operation unit 3 and the rear operation unit 4; reads the set contents corresponding to the playback mode of the mode selecting operation, from the playback mode setting memory 32; and sets the playback mode on the basis of the set contents. Here, the MODE key adopts the toggle type, in which the playback mode is selected in the order of the AM mode→the FM mode→the SAT mode→the CD mode→the DVD mode→the AM mode→the FM mode, - - - , and so on, for example.

The Pch memory 36 is composed of six memory areas Pch-1 to Pch-6, for example, which are individually stored with the receiving frequencies relating the predetermined broadcasting stations of the AM broadcast, the FM broadcast and the SAT broadcast. For example: the area Pch-1 is stored with the receiving frequency of the AM broadcasting station; the area Pch-2 with the receiving frequency of the FM broadcasting station; the area Pch-3 with the receiving frequency of the AM broadcasting station; the area Pch-4 with the receiving frequency of the SAT broadcasting station; the area Pch-5 with the receiving frequency of the AM broadcasting station; and the area Pch-6 with the receiving frequency of the FM broadcasting station.

The control unit 43: monitors the Pch selecting operation of the NEXT key from the front operation unit 3 and the rear operation unit 4 through the operation detection unit 37; reads the receiving frequency stored in the Pch of the Pch selecting operation; and executes the receiving action of the receiving frequency through the AM/FM radio tuner unit 13 or the SAT radio tuner unit 14. Here, the NEXT key adopts the toggle type, in which the Pch is selected in the order of Pch-1→Pch-2→Pch-3→Pch-4→Pch-5→Pch-6→Pch-1→Pch-2, - - - , and so on, for example.

The mode settings to rage unit 39 is constructed to include: a single mode setting memory 39B stored with the set contents of the single mode; a dual mode setting memory 39A stored with the set contents of the dual mode; and a last mode setting memory 39C for storing the playback mode of the front, which has been set just before the power source of the body device 2 was turned OFF, as the last play-back source.

Here, the last mode setting memory 39C stores, when the power of the body device 2 is turned OFF, the last playback mode that has been aurally outputted by the speaker 5 just before the power OFF, as the last play-back source.

In the set contents of the single mode to be stored in the single mode setting memory 39B, only the aural outputs from the front speakers 5A and the rear speakers 5B are made effective, so that the speaker mute circuit 17 and the rear mute circuit 18 are muted OFF whereas the headphone mute circuit 19 is muted ON.

In the set contents to be stored in the dual mode setting memory 39A, the aural outputs from the front speakers 5A and the headphone 6 are different or common play-back sources so that they may be effective. Therefore: the speaker mute circuit 17 is muted OFF; the rear mute circuit 18 is muted ON; and the headphone mute circuit 19 is muted OFF. Here, the output unit on the front side is only the front speakers 5A, and the output unit on the rear side is only the headphone 6.

The mode setting unit 40 sets the system mode on the basis of the set contents of the dual mode setting memory 39A and the single mode setting memory 39B. On the basis of these set contents, moreover, the mute control unit 35 controls the speaker mute circuit 17, the rear mute circuit 18 and the headphone mute circuit 19.

The output switching control unit 34 controls the speaker output switching unit 15 and the headphone output switching unit 16 for selecting/outputting the sound signals from the designated one of the play-back sources.

When the key operation of the mute/pause key of the front operation unit 3 or the rear operation unit 4 is detected through the operation detection unit 37, moreover, the control unit 43 controls the output switching control unit 34 and the mute control unit 35, so that the aural signals from the play-back source designated in the prevailing playback mode maybe brought into the output stopped state (or the mute/pause state).

When the telephone interruption detection signal is detected at the TEL interruption detecting unit 42, moreover, the control unit 43 controls the output switching control unit 34 and the mute control unit 35 so that the aural signals from the play-back source designated in the prevailing playback mode on the front side may be brought into the output-stopped state (or the mute/pause state). When the telephone interruption detection signal is detected in the dual mode, for example, the control unit 43 brings the aural signals from the play-back source designated in the prevailing playback mode on the front side into the output-stopped state (or the mute/pause state), and outputs the aural signals of the telephone aurally in place of the aural signals coming from that play-back source.

Basically, the body device 2 accepts all the key operations from the front operation unit 3 effectively. However, the following restrictions are imposed on the acceptances of the key operations from the rear operation unit 4.

In the dual mode and in the common playback mode, and in case the play-back signals from the play-back sources are in the mute/pause state (or in the output-stopped state), the body device 2 accepts the key operations of only the SP/HP key and the MODE key but not others from the rear operation unit 4.

Here, in the dual mode and in the common playback mode, and in case the play-back signals are in the mute/pause state, the body device 2 accepts all the key operations when another playback mode is selected with the MODE key from the rear operation unit 4, because no influence is exerted on the front side.

In the dual mode and in the common playback mode, and in case the play-back signals are in the mute/pause state, moreover, the body device 2 sets the single mode while continuing the mute/pause state, when the single mode is selected with the SP/HP key from the rear operation unit 4.

In the single mode and in case the play-back signals from the play-back source are in the mute/pause state (or in the output-stopped state), moreover, the body device 2 accepts only the key operation of the SP/HP key effectively from the rear operation unit 4 but not other key operations.

Here in the single mode and in case the play-back signals are in the mute/pause state, the body device 2 sets the dual mode while continuing the mute/pause state on the front side, when the dual mode is selected with the SP/HP key from the rear operation unit 4.

Beside, the play-back device corresponds to the body device 2; the play-back source to the CD playback unit 12 (i.e., the CD mode), the AM/FM radio tuner unit 13 (i.e., the AM mode and the FM mode), the SAT radio tuner unit 14 (i.e., the SAT mode) and the external DVD device 7 (i.e., the DVD mode); the first output unit to the speaker 5, the output switching control unit 34 and the mute control unit 35; the second output unit to the head phone 6, the output switching control unit 34 and the mute control unit 35; the first operation unit to the front operation unit 3; the second operation unit to the rear operation unit 4; the control unit and the output stop setting unit to the control unit 43, the output switching control unit 34 and the mute control unit 35; the interruption detecting unit to the TEL interruption detecting unit 42; and the output-stopped state to the mute/pause state.

Here will be described the actions of the vehicular audio system 1 according to this embodiment.

In the microcomputer 21 of the body device 2, when the DVD mode is set in the single mode, for example, the output switching control unit 32 controls the speaker output switching unit 15 so that the sound signals from the external DVD device 7 may be selected and outputted.

On the basis of the set contents stored in a single mode setting memory 39B, moreover, the mute control unit 33 mutes OFF the speaker mute circuit 17 and the rear mute circuit 18 but ON the headphone mute circuit 19.

Here in the body device 2, the sound signals from the external DVD device 7 are aurally outputted only from the front speakers 5A and the rear speakers 5B but not from the headphone 6.

In the microcomputer 21 of the body device 2, on the other hand, when case there is set the ordinary dual mode for setting the CD mode on the front side and the DVD mode on the rear side, the output switching control unit 32 controls the speaker output switching unit 15 so that the sound signals from the CD playback unit 12 may be selected and outputted to the front side, and the headphone output switching unit 16 so that the sound signals from the external DVD device 7 may be selected and outputted to the rear side.

On the basis of the set contents of the ordinary dual mode stored in the dual mode setting memory 39A, moreover, the mute control unit 33 mutes OFF the speaker mute circuit 17, ON the rear mute circuit 18 and OFF the headphone mute circuit 19.

The body device 2 can output the sound signals from the CD playback unit 12 aurally not from the rear speakers 5B but from only the front speakers 5A, and can output the sound signals from the external DVD device 7 aurally from the headphone 6. In short, the front side outputs the sound signals aurally from the CD playback unit 12 and the sound signals aurally from the external DVD device 7.

Here will be described the rear operation key accepting procedure of the body device 2. FIG. 4 is a flow chart showing the processing actions of the microcomputer 21 to participate in the rear operation key accepting procedure of the body device 2.

The rear operation key accepting procedure shown in FIG. 4 is a key accepting procedure of the body device 2 for judging whether the various key operations from the rear operation unit 4 are effectively accepted or not but made ineffective.

In FIG. 4, the control unit 43 of the microcomputer 21 decides it (at Step S11) through the operation detection unit 37 whether or not the key operation has been detected.

If the key operation from the rear operation unit 4 is detected, the control unit 43 decides (at Step S12) whether or not the key operation is the SP/HP key.

If the key operation of the SP/HP key is decided, the control unit 43 decides (at Step S13) whether or not the prevailing system setting mode is the single mode.

If the single mode is decided, the control unit 43 ends these processing actions by accepting the key operation of the SP/HP key from the rear operation unit 4 effectively thereby to set the dual mode (at Step S14) in response to that key operation.

If it is decided at Step S13 that the prevailing system setting mode is not the single mode, moreover, the control unit 43 judges that the prevailing system setting mode is the dual mode, and accepts the key operation of the SP/HP key of the rear operation unit 4 thereby to end these processing actions by setting the single mode (at Step S15) in response to that key operation.

If it is decided at Step S12 that the key operation from the rear operation unit 4 is not the SP/HP key, moreover, the control unit 43 decides (at Step S16) whether or not that key operation is that of the MODE key.

If the key operation of the MODE key is decided, the control unit 43 decides (at Step S17) whether or not the prevailing system setting mode is the single mode.

If it is decided that the prevailing system setting mode is the single mode, the control unit 43 decides (at Step S18) it through the mute/pause monitor unit 41 whether or not the front side is in the mute/pause state. Here, it occurs that the front side is in the mute/pause state in case the sound signals are brought into the output-stopped state in response to the key operation by the mute/pause key from the front operation unit 3 or in case the sound signals are brought into the output-stopped state by detecting the telephone interruption detection signal, for example.

If it is decided that the front side is in the mute/pause state, the control unit 43 does not accept the key operation (of the MODE key) from the rear operation unit 4 but makes it ineffective, and ends these processing actions by outputting and displaying the notification of the operation ineffectiveness (at Step S19) so as to notify the user that the key operation is ineffective. Here, in the single mode and in case the front side is in the mute/pause state, the control unit 43 does not accept the playback mode selecting operation by the MODE key of the rear operation unit 4 but makes it ineffective while continuing the mute/pause state of the front side.

If it is decided at Step S18 that the front side is not the mute/pause state, the prevailing system setting mode is the single mode. Therefore, the control unit 43 accepts the key operation of the MODE key of the rear operation unit 4 effectively, and ends these processing actions by setting the playback mode according to that key operation on the front side and on the rear side (at Step S20). Here, the playback mode setting unit 33 of the control unit 43 sets the front side and the rear side in the CD mode when it receives the key operation of the MODE key of the rear operation unit 4 for setting the CD mode, for example.

If it is decided at Step S17 that the prevailing system setting mode is not the single mode, on the other hand, the control unit 43 judges that the system setting mode is the dual mode, and accepts the key operation of the MODE key of the rear operation unit 4 effectively, and ends these processing actions by setting the playback mode according to that key operation only on the rear side (at Step S21). Here, the playback mode setting unit 33 of the control unit 43 sets the rear side in the CD mode when it effectively accepts the key operation of the rear operation unit 4 for setting the CD mode, for example.

If it is decided at Step S16 that the key operation of the rear operation unit 4 is not the MODE key, the control unit 43 decides (at Step S22) whether or not the prevailing system setting mode is the single mode.

If it is decided that the prevailing system setting mode is the single mode, the control unit 43 decides (at Step S23) it through the mute/pause monitor unit 41 whether or not the front side is in the mute/pause state.

If it is decided that the front side is in the mute/pause state, the control unit 43 does not accept the key operation from the rear operation unit 4 but makes it ineffective, and ends these processing actions by outputting and displaying the operation ineffectiveness notification in the display unit 20 so as to notify the user that the key operation is ineffective. Here in the single mode and in case the front side is in the mute/pause state, the control unit 43 does not accept the action key operation of the rear operation unit 4 such as the key operation of the track UP/DOWN key but makes it ineffective while continuing the mute/pause state of the front side.

If it is decided at Step S23 that the front side is not in the mute/pause state, the prevailing system setting mode is the single mode. Therefore, the control unit 43 accepts the key operation of the action key of the rear operation unit 4 effectively, and ends these processing actions by executing (at Step S25) the key action on the front side and on the rear side in response to that key operation. Here, the control unit 43 switches the track position of the CD being played back, when it accepts the key operation of the track UP/DOWN key of the rear operation unit 4, for example.

If it is decided at Step S22 that the prevailing system setting mode is not the single mode, the control unit 43 judges that the system setting mode is the dual mode, and decides whether or not (at Step S26) the front side and the rear side are in the common playback mode and whether or not the front side in the mute/pause state.

If it is decided that the front and the rear side are in the common playback mode and that the front side is in the mute/pause state, the control unit 43 does not accept the key operation of the action key from the rear operation unit 4 but makes it ineffective. The control unit 43 ends these processing actions by outputting and displaying the operation ineffectiveness notification in the display unit 20 so as to notify the user that the key operation is ineffective (at Step S27). Here, in the dual mode, in case the front side and the rear side are in the common playback mode and in case the front side is in the mute/pause state, the control unit 43 does not accept the action key operation of the rear operation unit 4 such as the key operation of the track UP/DOWN key but makes it ineffective while continuing the mute/pause state on the front side.

If it is decided at Step S26 that the front side and the rear side are in the common playback mode and that the front side is not in the mute/pause state, the control unit 43 accepts the key operation of the action key of the rear operation unit 4 effectively, and ends these processing actions by executing the key action according to that key operation only on the rear side (at Step S28). Here, the control unit 43 switches the track position of the CD being played back on the front side and on the rear side, when it accepts the key operation of the track UP/DOWN key of the rear operation unit 4, for example.

According to the rear operation key accepting procedure shown in FIG. 4, in the single mode and in case the front side is in the mute/pause state, the situation, in which the playback mode is switched against the will of the passenger on the front side, can be reliably prevented by not accepting the playback mode selecting operation with the MODE key from the rear operation unit 4 but making it ineffective while continuing the mute/pause state on the front side.

According to the rear operation key accepting procedure shown in FIG. 4, in the single mode and in case the front side is in the mute/pause state, the situation, in which the action is switched against the will of the passenger on the front side, can be reliably prevented by not accepting the action key operation from the rear operation unit 4 such as the key operation of the track UP/DOWN key but making it ineffective while continuing the mute/pause state on the front side.

According to the rear operation key accepting procedure shown in FIG. 4, in the dual mode and in case the front side and the rear side are in the common playback mode and in case the front side is in the mute/pause state, the situation, in which the action is switched against the will of the passenger on the front side, can be reliably prevented by not accepting the action key operation from the rear operation unit 4 such as the key operation of the track UP/DOWN key but making it ineffective while continuing the mute/pause state on the front side.

According to this embodiment, in case the front side and the rear side are in the common playback mode and in case the front side is in the mute/pause state, the situation, in which the mute/pause state is released against the will of the passenger on the front side, can be reliably prevented by not accepting the operation to release the mute/pause state, if any, from the rear operation unit 4 but making it ineffective while continuing the mute/pause state on the front side.

According to this embodiment, in case the front side and the rear side are in the common playback mode and in case the front side is in the mute/pause state by the key operation of the mute/pause key of the front operation unit 3, the situation, in which the mute/pause state is released against the will of the passenger on the front side, can be reliably prevented by not accepting the operation to release the mute/pause state, if any, from the rear operation unit 4 but making it ineffective while continuing the mute/pause state on the front side.

According to this embodiment, in case the front side and the rear side are in the common playback mode and in case the front side is in the mute/pause state on the basis of the telephone interruption detection signal, the situation, in which the mute/pause state is released against the will of the passenger on the front side, can be reliably prevented by not accepting the operation to release the mute/pause state, if any, from the rear operation unit 4 but making it ineffective while continuing the mute/pause state on the front side.

According to this embodiment, when the front side is set in the mute/pause state in response to the key operation from the front operation unit 3, the situation, in which the mute/pause state of the front side is released from the rear operation unit 4, can be reliably prevented by not accepting the operation to release the mute/pause state, if any, from the rear operation unit 4 but making it ineffective.

According to this embodiment, when the front side is set in the mute/pause state on the basis of the telephone interruption detection signal, the situation, in which the mute/pause state of the front side is released from the rear operation unit 4, can be reliably prevented by not accepting the operation to release the mute/pause state, if any, from the rear operation unit 4 but making it ineffective.

Here in the aforementioned embodiment, there has been described the example, in which the mute/pause state of the front side is prevented from the standpoint of the front user from being randomly released by the key operation from the rear operation unit 4. However, there is provided a function to discriminate and monitor the telephone using state on the front side and on the rear side, for example. When the telephone interruption detection signal to detect the telephone using state of the rear side is detected, the rear side is set in the mute/pause state. In case the rear side is in the mute/pause state, the situation, in which the mute/pause state is released against the will of the passenger on the rear side, can be reliably prevented by not accepting the operation to release the mute/pause state of the rear side, if any, from the front operation unit 3 but making it ineffective while continuing the mute/pause state on the rear side.

In the aforementioned embodiment, moreover, the operation ineffectiveness notification is outputted and displayed in the display unit 20 so as to notify the user that the key operation is ineffective at Step S19, Step S24 and Step S27 shown in FIG. 4. However, the user may be notified of the fact that the key operation is ineffective, by outputting a beep or the like aurally.

In the aforementioned embodiment, moreover, more various restrictions are imposed on the rear operation unit 4 than the front operation unit 3 so that the rear operation unit 4 is set to have a lower priority than that of the front operation unit 3. In case the mute/pause state is set by the front operation unit 3, for example, the operation to release the mute/pause state is not accepted but made ineffective even if it is done from the rear operation unit 4 of the lower priority. However, the operation unit incapable of releasing the mute/pause state can be suitably changed on the user side by providing a priority setting function to suitably change the priority to be given to the rear operation unit 4 and the front operation unit 3, for example.

Moreover, the aforementioned embodiment has been described by enumerating the CD, the DVD and so on as the playback function of the play-back source. However, it goes without saying that similar effects can be attained even by the recording media such as the MD.

Moreover, the aforementioned embodiment has been described by enumerating the headphone 6 as the output unit on the rear side so that the sound of the rear side may not leak to the user on the front side. However, it goes without saying that similar effects can be attained even if the output unit on the rear side is exemplified by such a highly directive speaker that only the user on the rear side can hear.

In the aforementioned embodiment, moreover, when the telephone interruption is detected, the front side is set in the mute/pause state so that the operation to release the mute/pause state, even if done from the rear operation unit 4, is not accepted but made ineffective. However, it is arbitrary to do the following actions.

FIG. 5 is a flow chart showing the processing actions of the microcomputer 21 to participate in the rear operation key accepting procedure during the telephone interruption of the body device 2 according to another embodiment.

The rear operation key accepting procedure during the telephone interruption, as shown in FIG. 5, is that of the body device 2 either to accept the key operation of the rear operation unit 4 effectively during the telephone interruption or not to accept but make it ineffective.

In FIG. 5, the control unit 43 of the microcomputer 21, decides (at Step S31) whether or not the key operation from the rear operation unit 4 has been detected through the operation detection unit 37.

If the key operation from the rear operation unit 4 is detected, the control unit 43 decides (at Step S32) whether or not the telephone is interrupting. Here in the body device 2, in the case of the telephone interruption, the play-back signals from the play-back source designated on the front side are brought into the mute/pause state so that the output on the front side is changed into the conversation sound signals of the telephone.

If it is decided at Step S32 that the telephone is not interrupting, the routine transfers to Step S12 of the rear operation key accepting procedure shown in FIG. 4 (at Step S33), so that the control unit 43 may effectively accept the key operation to control the volume of the play-back signals from the play-back source designated on the front side, for example.

If it is decided at Step S32 that the telephone is interrupting, moreover, the control unit 43 decides (at Step S34) the key operation of the rear operation unit 4 is the SP/HP key.

If it is decided that the key operation is of the SP/HP key, the control unit 43 decides (at Step S35) whether or not the prevailing system setting mode is the single mode.

If it is decided that the system setting mode is the single mode, the control unit 43 accepts the key operation of the SP/HP key effectively from the rear operation unit 4, and ends these processing actions by setting the dual mode (at Step S36) in response to the key operation.

If it is decided at Step S35 that the prevailing system setting mode is not the single mode but the dual mode, the control unit 43 accepts the key operation of the SP/HP key effectively from the rear operation unit 4, and ends these processing actions by setting the single mode (at Step S37) in response to that key operation.

If it is decided at Step S34 that the key operation of the rear operation unit 4 is not the SP/HP key, the control unit 43 does not accept the key operation from the rear operation unit 4 such as the key operation to control the volume of the play-back signals from the play-back source designated on the front side, and ends these processing actions by outputting and displaying the operation ineffectiveness notification (at Step S38) in the display unit 20 so as to notify the user that the key operation is ineffective.

Thus according to the other embodiment, even if the key operation to exert influences on the output state of the front side, such as the key operation from the key other than the SP/HP key is done from the rear operation unit 4 while the telephone is being used, it is inhibited to accept that key operation of the rear operation unit 4. Therefore, a satisfactory communication environment can be provided by reliably preventing the situation, in which the key operation of the rear operation unit 4 relating to the control to obstruct the communications by the volume control or the like, such as the volume controlling operation might otherwise be effectively accepted during the telephone communications.

According to the play-back device of the invention thus constructed, when the common play-back source is selected by the first output unit and the second output unit and if it is decided that the play-back signals from the play-back source selected are brought into the output-stopped state, the release of the output-stopped state is inhibited even if the operation to release the state is done from the second operation unit. In case the play-back signals from the play-back source are in the output-stopped state while the common play-back source is being selected by the first output unit (on the front side) and the second output unit (on the rear side), therefore, it is possible to reliably prevent the situation, in which that output-stopped state might otherwise be randomly released, even if the operation is done from the second operation unit (on the rear side).

According to the play-back device of the invention, moreover, when the play-back signals from the play-back source are set in the output-stopped state in response to the operation from the first operation unit, the release of the output-stopped state is inhibited even if the operation to release the state is done from the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to the play-back device of the invention, moreover, when the play-back signals from the play-back source are set in the output-stopped state in response to the operation from the first operation unit, the release of the output-stopped state is inhibited even if the operation to release the state is done from either the first operation unit or the second operation unit. In case the play-back signals from the play-back source are brought into the output-stopped state on the basis of the interruption detection signal, therefore, it is possible to reliably prevent the situation, in which that output-stopped state might otherwise be released, even if the operation is done from the second output unit (on the rear side).

According to the play-back device of the invention, moreover, if it is decided on the basis of the interruption detection signal to detect the used state of the telephone, for example, that the play-back signals from the common play-back source are brought into the output-stopped state, the operation relating to the play-back signals in the output-stopped state is inhibited to be accepted even if the operation is done from the second operation unit. In case the play-back signals from the play-back source are in the output-stopped state on the basis of the interruption detection signal to detect the used state of the telephone while the common play-back source is being selected by the first output unit (on the front side) and the second output unit (on the rear side), therefore, it is possible to reliably prevent the effective acceptance of the operation on the play-back signals in the output-stopped state and from the second operation unit (on the rear side), even if that operation is done.

Thus according to the play-back device of the invention, moreover, even if the operation to control the output state relating to the play-back signals from the play-back source selected by the first output unit (on the front side) is done from the second operation unit (on the rear side) when the used state of the telephone is detected, it is inhibited to accept that operation of the second operation unit. Therefore, a satisfactory communication environment can be provided by reliably preventing the situation, in which the operation of the rear operation unit (on the rear side) relating to the control to obstruct the telephone communications might otherwise be effectively accepted during the communications.

According to the play-back device of the invention, moreover, even if the operation to control the volume of the play-back signals from the play-back source selected by the first output unit (on the front side) is done from the second operation unit (on the rear side) when the used state of the telephone is detected, it is inhibited to accept that operation of the second operation unit. Therefore, a satisfactory communication environment can be provided by reliably preventing the situation, in which the operation of the rear operation unit (on the rear side) relating to the volume control to obstruct the telephone communications on the front side might otherwise be effectively accepted during the communications.

What is claimed is:

1. A play-back device comprising:
   a plurality of play-back sources;
   a first output unit and a second output unit for selecting at least one of the play-back sources to output play-back signals from the at least one of the play-back sources;
   a first operation unit for operations relating to the first output unit;
   a second operation unit for operations relating to the second output unit;
   a control unit for deciding whether the first output unit and the second output unit have selected a common play-back source and whether the play-back signals from the common play-back source are in an output-stopped state and for inhibiting the release of the output-stopped state from a lower priority one of the first operation unit and the second operation unit in response to the control unit deciding that the play-back signals from the common play-back source are in an output-stopped state; and
   a priority setting unit for setting a priority for the first operation unit and the second operation unit.

2. The play-back device according to claim 1, wherein the control unit includes an output stop setting unit for bringing the play-back signals from the at least one of the play-back sources in response to the operation from the first operation unit.

3. The play-back device according to claim 1, wherein the control unit includes:
   an interruption detecting unit for detecting an interruption signal; and
   an output stop setting unit for bringing the play-back signals from the at least one of the play-back sources into the output-stopped state when the interruption signal is detected by the interruption detecting unit.

4. The play-back device according to claim 3, wherein the interruption detecting unit detects the interruption signal to detect the used state of a telephone.

5. The play-back device according to claim 1, wherein the second output unit comprises a headphone.

6. The play-back device according to claim 1, wherein the first output unit outputs the play-back signals to the front side of a vehicular compartment, and wherein the second output unit outputs the play-back signals to the rear side of the vehicular compartment.

7. A play-back device comprising:
   a first operation unit and a second operation unit for operations to control the output states relating to play-back signals from a play-back source;
   an interruption detecting unit for detecting an interruption signal;
   a control unit for
      determining whether the first operation unit and the second operation unit have selected a common play-back source and whether play-back signals from the common play-back source are in an output-stopped state in response to the interruption detecting unit detecting the interruption signal, and
      for inhibiting the release of the output-stopped state from a lower priority one of the first operation unit and the second operation unit when the control unit determines that the play-back signals from the common play-back source are in an output-stopped state; and
   a priority setting unit for setting a priority for the first operation unit and the second operation unit.

8. A play-back device comprising:
   a first operation unit and a second operation unit for operations to control the output states relating to play-back signals from a play-back source;
   an interruption detecting unit for detecting an interruption signal;
   a control unit for
      determining whether the first operation unit and the second operation unit have selected a common play-back source and whether play-back signals from the common play-back source are in an output-stopped state in response to the interruption detecting unit detecting the interruption signal, and
   for inhibiting the release of the output-stopped state when the control unit determines that the play-back signals from the common play-back source are in an output-stopped state; and
   a priority setting unit for setting a priority for the first operation unit and the second operation unit, wherein the control unit inhibits the release of the output-stopped state even if the operation to release the output-stopped state is done from a lower priority one of the first operation unit and the second operation unit on the basis of the priority set by the priority setting unit.

9. A play-back device comprising:
   a plurality of play-back sources;
   a first output unit and a second output unit for selecting at least one of the play-back sources to output play-back signals from the at least one of the play-back sources;
   a first operation unit for operations relating to the first output unit;
   a second operation unit for operations relating to the second output unit;
   an interruption detecting unit for detecting an interruption signal;
   an output stop setting unit for bringing play-back signals from the at least one of the play-back sources into an output-stopped state when the interruption signal is detected by the interruption detecting unit;
   a control unit
      for determining whether a common play-back source is selected by the first output unit and the second output unit and whether the common play-back source is in an output-stopped state, and for inhibiting the acceptance of the operation relating to the play-back signals in the output-stopped state from a lower priority one of the first operation unit and the second operation unit in response to the control unit determining that the common play-back source is in an output-stopped state; and a priority setting unit for setting a priority for the first operation unit and the second operation unit.

10. A play-back device comprising:

a plurality of play-back sources;

a first output unit and a second output unit for selecting at least one of the play-back sources to output play-back signals from the at least one of the play-back sources;

a first operation unit and a second operation unit for operations to control the output state relating to the play-back signals from the at least one of the play-back sources;

an interruption detecting unit for detecting an interruption signal;

a control unit for determining whether the first output unit and the second output unit select a common play-back source, and for inhibiting the acceptance of an operation from a lower priority one of the first operation unit and the second operation unit to control the output state relating to the play-back signals from the common play-back source in response to the interruption detecting unit detecting the interruption signal; and a priority setting unit for setting a priority for the first operation unit and the second operation unit.

11. A play-back device according to claim 10, wherein the control unit inhibits, when the interruption signal is detected by the interruption detecting unit, the acceptance of the operation from the lower priority one of the first operation unit and the second operation unit to control the volume of the play-back signals from the play-back source selected by the first output unit.

12. A play-back device according to claim 10, wherein the interruption detecting unit detects the interruption signal to detect the used state of a telephone.

13. A play-back device according to claim 10, wherein the first output unit outputs the play-back signals to the front side of a vehicular compartment, and wherein the second output unit outputs the play-back signals to the rear side of the vehicular compartment.

14. The device of claim 1, wherein said output-stopped state comprises a mute state.

15. The device of claim 1, wherein said output-stopped state comprises a pause state.

16. The device of claim 1, wherein said control unit accepts a signal from said second output unit to switch between a single mode and a dual mode.

17. The device of claim 16, wherein said control unit accepts operation signals for a headphone unit from said second output unit when said dual mode is selected.

18. The device of claim 17, wherein action key signals are accepted for play-back modes from said second output unit when said dual mode is selected.

19. The device of claim 1, wherein said control unit accepts a signal from said second output unit to switch between play-back modes.

20. The device of claim 1, wherein when the output-stopped state of the play-back signals is set by one of said first operation unit and said second operation unit, the output-stopped state is not releasable by the other of said first operation unit and said second operation unit.

21. The device of claim 1, wherein said priority setting unit sets a higher priority to whichever of said first operation unit and said second operation unit has set the output-stopped state.

22. The device according to claim 7, wherein said priority setting unit sets the priority in advance of the output-stopped state of the play-back signals being set.

23. The device according to claim 22, wherein said priority setting unit sets the priority of one of said first operation unit and said second operation unit to a low priority and one of said first operation unit and said second operation unit to a high priority, and wherein when the output-stopped state of the play-back signals is set in response to the interruption signal, the output-stopped state is not releasable by operation of the operation unit having a lower priority.

* * * * *